(12) United States Patent
Sakashita et al.

(10) Patent No.: US 6,719,427 B2
(45) Date of Patent: Apr. 13, 2004

(54) DISPLAY DEVICE, PROJECTION DISPLAY APPARATUS, DRIVING DEVICE FOR LIGHT MODULATOR, AND METHOD FOR DRIVING LIGHT MODULATOR

(75) Inventors: Yukihiko Sakashita, Kanagawa (JP); Akihiko Ouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/969,776

(22) Filed: Oct. 4, 2001

(65) Prior Publication Data
US 2002/0044262 A1 Apr. 18, 2002

(30) Foreign Application Priority Data
Oct. 17, 2000 (JP) ......................................... 2000-316478

(51) Int. Cl.$^7$ .................... G03B 21/00; G03B 21/14; G03B 21/28; G09G 5/00; G02F 1/1335
(52) U.S. Cl. ...................... 353/31; 353/98; 353/99; 353/84; 353/121; 345/89; 349/5
(58) Field of Search .......................... 353/31, 84, 99, 353/98, 121; 345/89, 105, 596; 349/5, 6, 7, 8; 359/618, 291

(56) References Cited

U.S. PATENT DOCUMENTS

| | | | |
|---|---|---|---|
| 5,623,281 A | 4/1997 | Markandey et al. | 345/108 |
| 5,726,718 A | 3/1998 | Doherty et al. | 348/771 |
| 6,037,922 A * | 3/2000 | Yagyu | 345/85 |
| 6,052,217 A | 4/2000 | Hwang | 359/291 |
| 6,324,006 B1 * | 11/2001 | Morgan | 359/618 |
| 6,417,864 B1 * | 7/2002 | Jones et al. | 345/596 |
| 2001/0001120 A1 | 5/2001 | Masini | 606/86 |
| 2001/0048420 A1 * | 12/2001 | Yamamoto et al. | 345/89 |

FOREIGN PATENT DOCUMENTS

| | | | |
|---|---|---|---|
| JP | 8-214243 | 8/1996 | H04N/5/74 |
| JP | 8-214244 | 8/1996 | H04N/5/74 |
| JP | 10-508953 | 9/1998 | G09G/3/34 |
| JP | 11-72724 | 3/1999 | G02B/26/08 |

* cited by examiner

Primary Examiner—Russell Adams
Assistant Examiner—Melissa J Koval
(74) Attorney, Agent, or Firm—Fitzpatrick, Cella, Harper & Scinto (57) ABSTRACT

A display device includes a light modulator used as an image forming unit and a projection optical system for projecting and displaying an image. In the display device, gradation is represented by varying the ON-time in the temporal axis during one frame period of the light modulator. The ON-time is used by at least three light components.

7 Claims, 7 Drawing Sheets

DISPLAY DEVICE, PROJECTION DISPLAY APPARATUS, DRIVING DEVICE FOR LIGHT MODULATOR, AND METHOD FOR DRIVING LIGHT MODULATOR

BACKGROUND OF THE INVENTION

1. Field of the Invention

The present invention relates to a display device, and particularly to a projection display apparatus using a reflective display device.

2. Description of the Related Art

Hitherto, a thin-film micromirror array (TMA) or the like is known as a display device for displaying an image by linearly varying an angle of a reflection mirror, and is disclosed in Japanese Patent Laid-Open No. 11-072724, Japanese Patent Laid-Open (by PCT route) No. 10-508953, and so on.

Also, a digital micromirror device (DMD) or the like is known as a display device in which a display element is driven by converting a high-gradation picture signal into a binary pulse submodulating signal in accordance with a time-division drive sequence, so as to perform high-gradation display, and is disclosed in Japanese Patent Laid-Open Nos. 8-214243 and 8-214244, and so on.

In a display device using a conventional linear driving method, however, brightness nonuniformity occurs in a display due to differences of reflection angles resulting from manufacturing variation of each display cell, thus causing deterioration of a display quality. Further, a D/A converter having the number of bits corresponding to the number of display gradations is required. This results in a problem that size of a circuit is large and cost is high.

When a display element is driven by converting a high-gradation picture signal into a binary pulse submodulating signal, display resolution is limited by the response speed and data transfer rate of a display device.

SUMMARY OF THE INVENTION

Accordingly, it is an object of the present invention to provide a display device, a projection display apparatus, a driving device for a light modulator, and a method for driving the light modulator, in which high-gradation is achieved while deterioration of display quality due to manufacturing variation can be overcome.

In order to achieve the object, the present invention provides a display device comprising a light modulator, wherein gradation is represented by varying the ON-time in the temporal axis during one frame period of the light modulator, and the ON-time is used by at least three light components.

The one frame period may comprise binary subframes for performing black/white display and a multilevel subframe for performing gradation display.

The present invention also provides a projection display apparatus comprising a light modulator used as image forming means and a projection optical system for projecting and displaying an image, wherein gradation is represented by varying the ON-time in the temporal axis during one frame period of the light modulator, and the ON-time is used by at least three light components.

Preferably, the light modulator is a reflective device including a micromirror, and the gradation is performed by controlling the micromirror to at least three reflection angles including a first reflection angle in which the amount of light reflection to the projection optical system is the maximum; a second reflection angle in which the amount of light reflection to the projection optical system is zero; and a third reflection angle between the first reflection angle and the second reflection angle in which the amount is between the amount for the first reflection angle and the amount for the second reflection angle.

It is desired that, in representing gradation by varying the ON-time in the temporal axis during one frame period, the light modulator has a first display period in which the second reflection angle and the first reflection angle are mutually switched for displaying, and a second display period in which the second reflection angle and the first reflection angle or the third reflection angle are mutually switched for displaying.

The second display period may the shortest period among a plurality of subframe periods in a time-division gradation representation of one frame period.

Preferably, in representing gradation by varying the ON-time in the temporal axis during one frame period, the light modulator has a first display period in which the second reflection angle and the first reflection angle are mutually switched for displaying, and a second display period in which the second reflection angle and the first reflection angle are mutually switched for displaying.

It is desired that the first display period and the second display period are allotted so that the total number of subframe periods for performing gradation by time-dividing one frame period is minimized.

According to the present invention, it becomes possible to reduce brightness nonuniformity in the display, which results from manufacturing variations of each display cell, which occurred in a conventional linear driving method. Conventional methods require a D/A converter having the number of bits corresponding to the number of display gradations. In contrast, the present invention requires a D/A converter having only the number of bits corresponding to the number of gradations represented by the subframe of the minimum period, hence, size of the circuit is reduced and low cost can be achieved.

By using a projection display apparatus, a driving device for a light modulator, and a method for driving the light modulator of a second embodiment of the present invention, the response speed needed for the device can be reduced, and the data transfer rate and transfer clock frequency can be suppressed.

The present invention also provides a method for driving a light modulator, comprising: dividing one frame period of the light modulator into subframe periods which have different periods corresponding to each bit; performing gradation display by at least ternary digits in the light modulator during the minimum subframe period; and performing binary gradation display during subframe periods other than the minimum subframe period.

The present invention also provides a method for driving a light modulator, comprising: performing a first driving state for white displaying, a second driving state for black displaying, and a third driving state for gradation display between the white displaying and the black displaying; setting the amount of light reflection in the third driving state to be small by a predetermined proportion to the amount of light reflection in the first driving state; dividing one frame period of the light modulator into subframe periods which have different periods corresponding to each bit; allotting any one of the first driving state and the third driving state to each of the subframe periods; defining a time slot corresponding to the minimum subframe period as a unit time slot; and reducing by the predetermined proportion the number of time slots in the subframe periods to which the first driving state is allotted, so as to reduce the total number of time slots in the one frame period, thereby making a unit time slot period, which is the one frame period divided by the reduced total number of time slots, longer than a unit time slot period, which is the one frame period divided by the unreduced total number of time slots.

Further objects, features and advantages of the present invention will become apparent from the following description of the preferred embodiments with reference to the attached drawings.

DESCRIPTION OF THE PREFERRED EMBODIMENTS

Hereinafter, embodiments of the present invention will be described in detail with reference to the drawings.
(First Embodiment)

Figure 1:
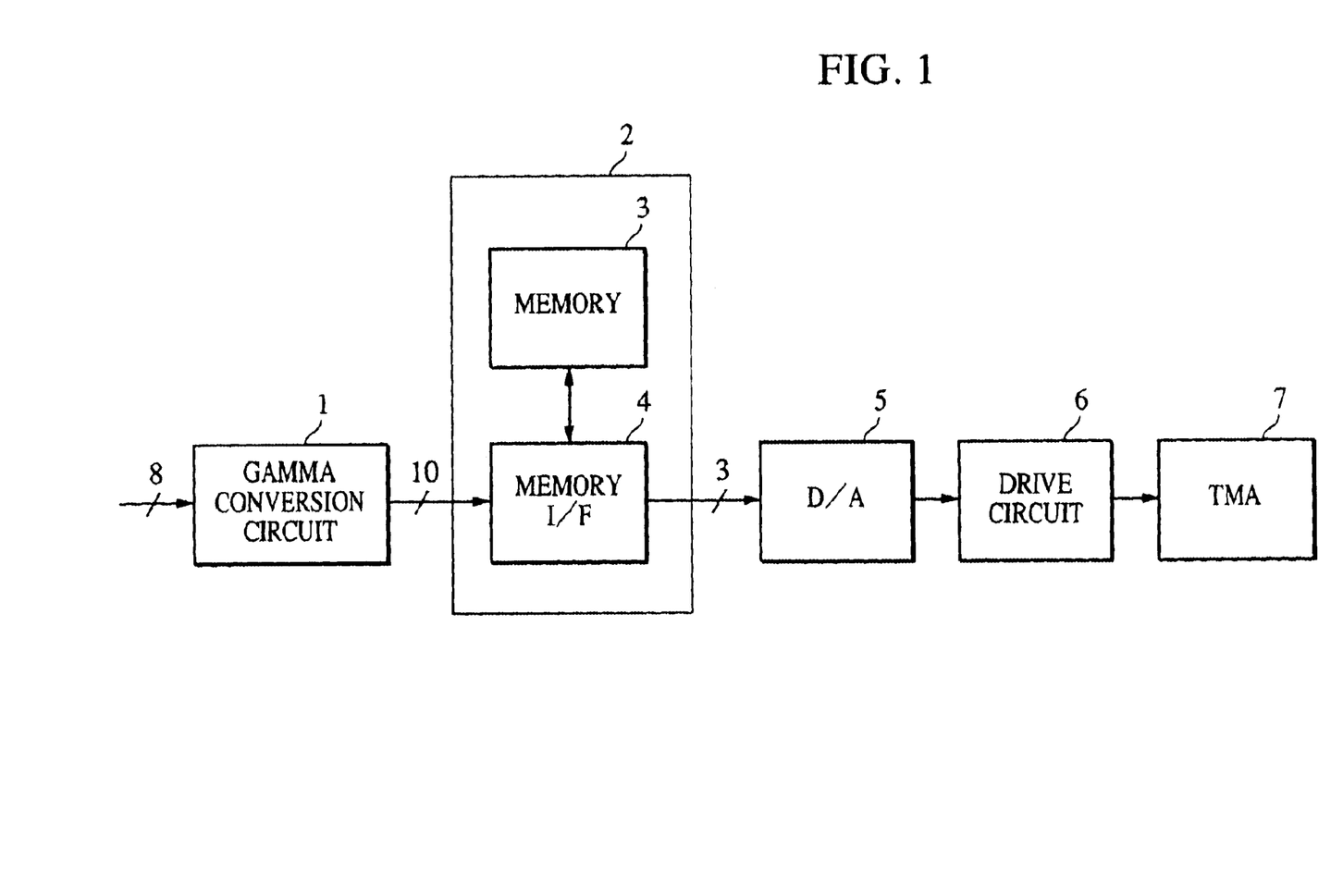
FIG. 1 is a functional block diagram of a first embodiment of the present invention.

FIG. 1 shows a functional block diagram based on a first embodiment of the present invention.

In FIG. 1, reference numeral 1 denotes a gamma conversion circuit, reference numeral 2 denotes a PWM conversion circuit, reference numeral 5 denotes a D/A conversion circuit, reference numeral 6 denotes a drive circuit, and reference numeral 7 denotes a TMA element which is a display device. The PWM conversion circuit 2 includes a memory 3 and a memory interface circuit 4.

A picture signal is input to the gamma conversion circuit 1 after various types of signal processing, such as contrast processing, brightness processing, color conversion, and scaling an image up/down, in a digital signal processor (DSP, not shown). In the gamma conversion circuit 1, degamma processing is performed on a gamma characteristic which is previously applied to the input picture signal, and gamma processing is performed in accordance with the gamma characteristic of the display device 7.

Figure 2:
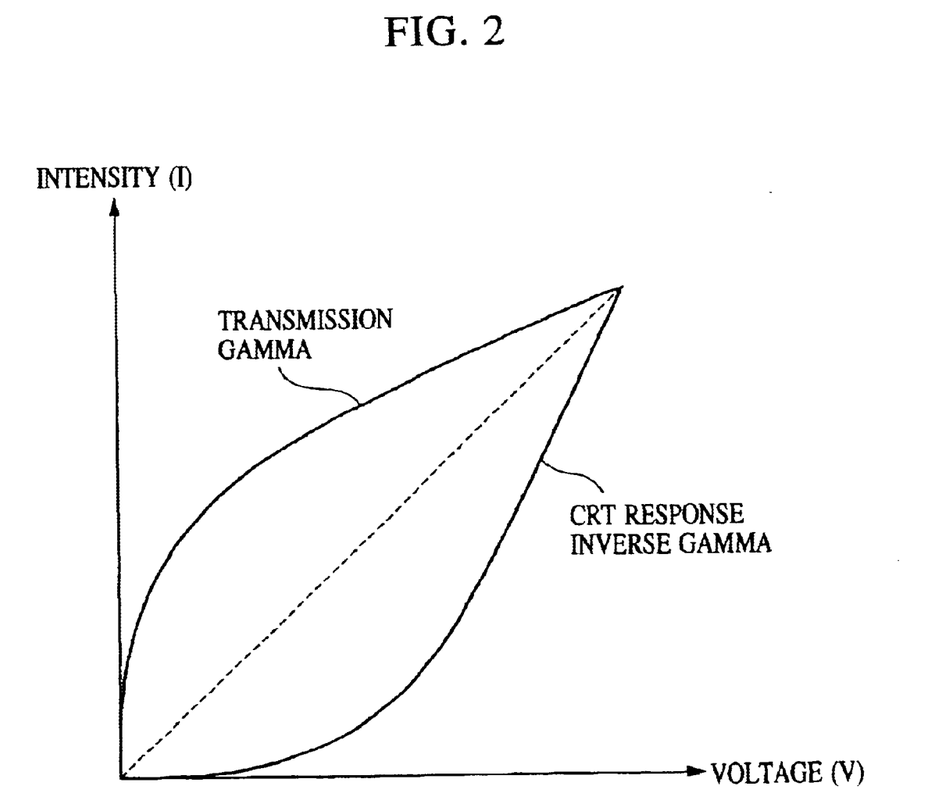
FIG. 2 illustrates a gamma conversion characteristic.

FIG. 2 shows an example of the degamma processing. Since the input picture signal usually has a transmission gamma characteristic suitable for a CRT display, the input picture signal is converted to have an inverse gamma characteristic (CRT response inverse gamma). Accordingly, as shown in FIG. 2, signal components at the black side are compressed resulting in deterioration of the gradation, thus causing image deterioration such as pseudo outlines.

In the gamma conversion circuit 1, the input picture signal is set to have a characteristic for offsetting the gamma characteristics of the transmission gamma and the display device 7 (degamma processing is performed). Since the TMA element used as the display device 7 has a linear gamma characteristic, as described in "Thin-film Micromirror Array for Information Display Systems" in Euro Display '99, in Berlin, only degamma processing of the transmission gamma is required.

The gamma conversion circuit 1 includes a lookup table (LUT) such as a RAM and is designed to prevent deterioration of the gradation by having more output bits than input bits. For example, a RAM having an 8-bit address and 10-bit data is used, and an input signal is input to the address and data is output.

The 10-bit data output from the gamma conversion circuit 1 is input to the memory 3 via the memory interface circuit 4.

Then, according to a subframe of the display device 7, the 10-bit data is read from the frame memory 3, is converted to a multilevel signal by the D/A conversion circuit 5, and is displayed on the TMA which is the display device 7, through the drive circuit 6.

A memory control circuit reads desired data from the memory 3 in accordance with the number of subframes in one frame, rearranges the data to a desired sequence in the memory interface circuit 4, and inputs the data to the D/A conversion circuit 5.

Hereinafter, a driving method according to the present invention will be described in detail.

First, a conventional driving method is described for comparison.

Figure 3:
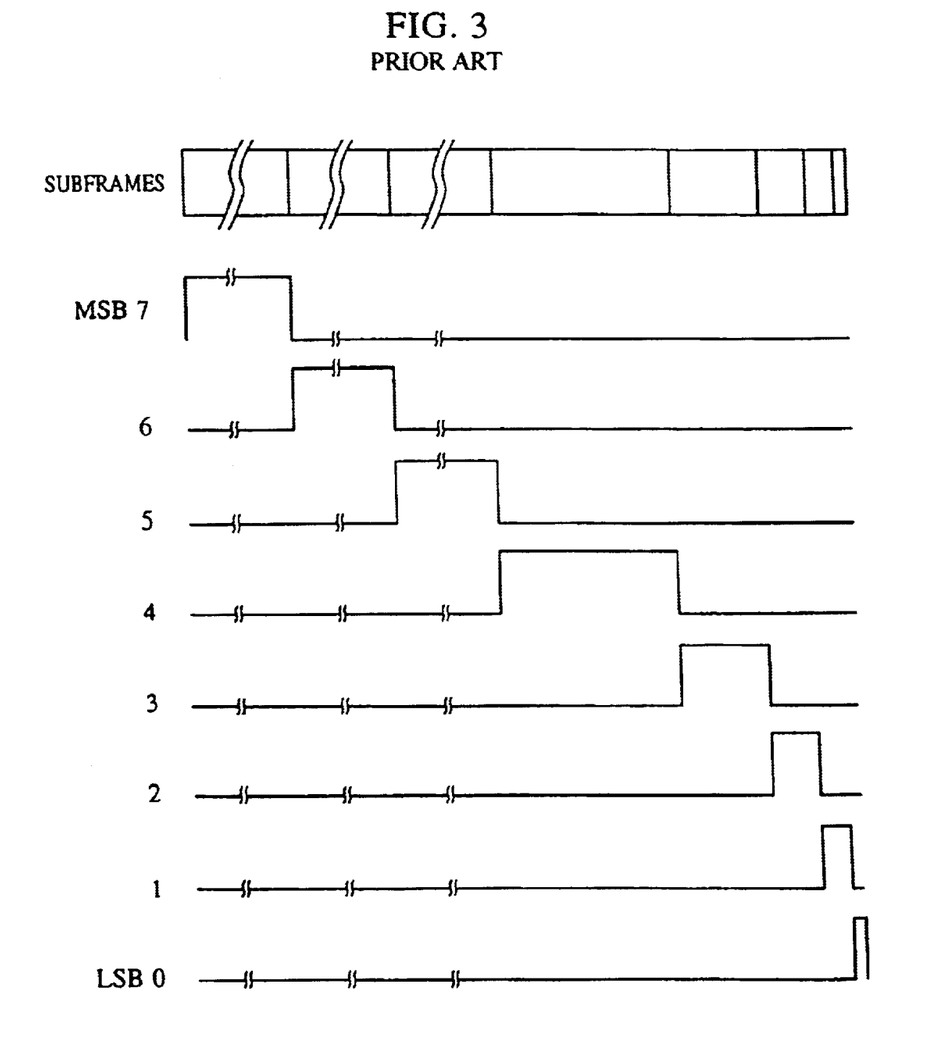
FIG. 3 illustrates a typical driving method.

FIG. 3 shows a case in which 8-bit (256) gradation display data corresponds to individual bit data and the gradation is represented by varying the ON-time. The reflection angle of the display device 7 is binary-controlled and the display device 7 displays white during the ON periods, and black during the OFF periods.

Subframe periods are allotted to one frame period according to the significance of each bit from the MSB to the LSB. The 8-bit data is divided into eight subframes, and ½, ¼, ⅛, 1/16, 1/32, 1/64, 1/128, and 1/256 of one frame period of ON-time are allotted to the seventh bit (MSB) to the zeroth bit (LSB), respectively. In other words, if the subframe period of the zeroth bit (LSB) having the minimum allotted time is a unit time slot, the number of time slots of one frame period is 255. Thus, if one frame period is 16.6 ms, the ON-time allotted to the unit time slot is 16.6 ms/255=65 μs. In the case of a color sequential method in which one frame is divided into three RGB colors, the ON-time is 21.7 μs, that is, ⅓ of the above case.

Thus, the feasible number of gradations is limited by the response speed of the display device. The number of gradations depends on the time allotted to the unit time slot.

Figure 4:
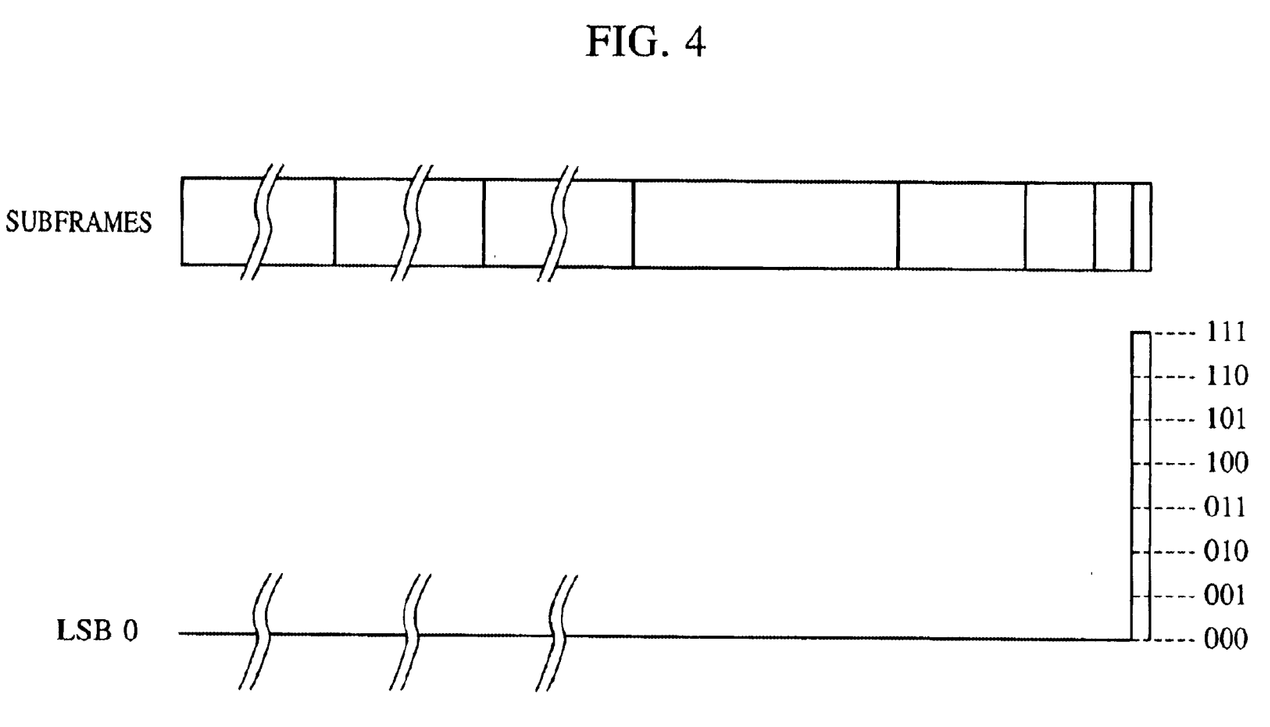
FIG. 4 illustrates a driving method of the first embodiment of the present invention.

FIG. 4 shows a driving method according to the present invention. Here, it is possible to display 10-bit (1024) gradation by using eight subframes corresponding to 8-bit (256) gradation, which is the same as that in FIG. 3. The driving method for seven subframes corresponding to the data of the seven higher-order bits is the same as that in FIG. 3.

In the 10-bit data, the ninth bit (MSB) to the third bit are allotted respectively to seven subframes which have periods of ½, ¼, ⅛, 1/16, 1/32, 1/64, and 1/128 of one frame period, during which black/white binary display is performed. Subsequently, a 3-bit (8) gradation, from the second bit to the zeroth bit (LSB), is allotted to the last eighth subframe, and the reflection angle of the display device 7 is varied within eight stages during this period so as to display eight gradations.

As described above, by performing multilevel display in the minimum period of the subframe, high-gradation and high-definition display can be achieved, without limitation by the response speed of the display device.

By driving, using the TMA element, it becomes possible to reduce brightness nonuniformity in the display, which results from manufacturing variations of each display cell, which occurred in a conventional linear driving method. Conventional methods require a D/A converter having the number of bits corresponding to the number of display gradations. In contrast, the present invention requires a D/A converter having only the number of bits corresponding to the number of gradations represented by the subframe of the minimum period, and thus size of the circuit is reduced and low cost can be achieved. In this embodiment, high-definition display of 1024 gradations can be achieved by using a 3-bit D/A converter.

(Second Embodiment)

In 8-bit (256) gradation display, one frame period is divided into eight subframes, as described in the first embodiment. When one frame period is 16.6 ms, a unit time slot is 65 μs (21.7 μs in a color sequential method).

In this case, if the display resolution is XGA (1024×768), the data transfer rate is 12 Gbps (36 Gbps in the color sequential method). In order to transfer the data with a 64-bit bus width, a transfer clock required is 187.5 MHz (562.5 MHz in the color sequential method).

Thus, the feasible number of gradations is limited also by the data transfer rate of the display device.

Figure 5:
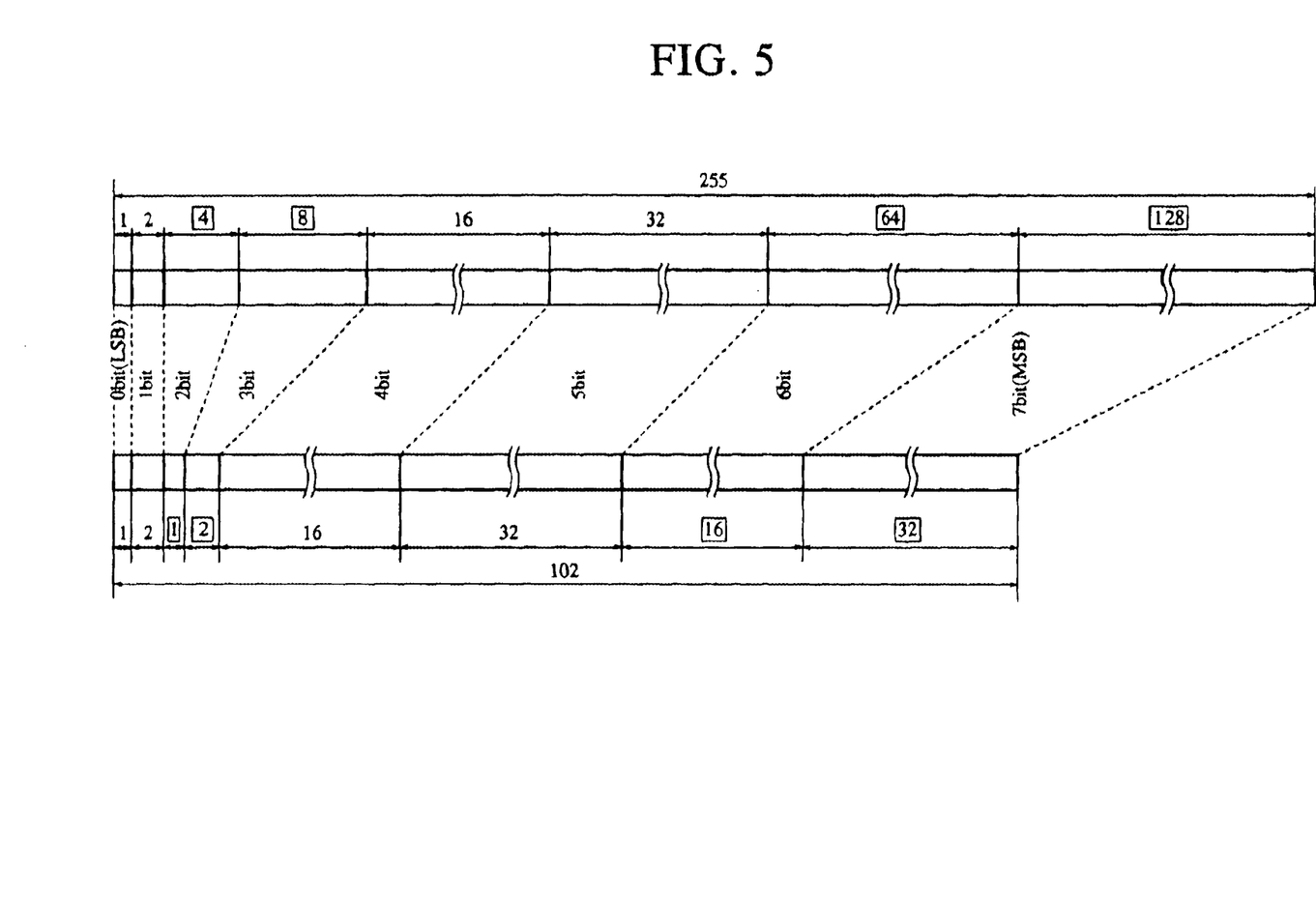
FIG. 5 illustrates a driving method of a second embodiment of the present invention.

FIG. 5 illustrates a driving method of a second embodiment according to the present invention. In FIG. 5, each subframe is represented by a number of unit time slot. In this case, 8-bit (256) gradation is performed, and a third driving state is defined in which the amount of light reflection is 25% (a third amount of light reflection) of that in a first driving state in which white is displayed (a first amount of light reflection). The amount of light reflection in the TMA element is controlled by the tilt angle of a micromirror, and the tilt angle is linearly controlled by drive voltage. Thus, the third driving state can be realized by making the drive voltage 25% of that in the first driving state.

Here, the following state is assumed, in which the subframe periods corresponding to the zeroth (LSB), first, fourth, and fifth bits are driven in the third driving state, and the subframe periods corresponding to the second, third, sixth, and seventh (MSB) bits are driven in the first driving state. In this case, the ratio of the amount of light reflection of the first driving state to the third driving state is 4:1. Thus, the number of required time slots in the first driving state may be ¼ of the number of required time slots in the third driving state. That is, the number of required time slots in the subframe periods corresponding to the second, third, sixth, and seventh (MSB) bits are 1, 2, 16, and 32, respectively. Thus, the total number of time slots needed for the 8-bit gradation display is 102, which is ½.5 of the case in which 8-bit gradation is displayed by the binary control of the first driving state and the second driving state.

In this case, the time allotted to the unit time slot is 163 μs if one frame period is 16.6 msec (54.5 μs in the color sequential method).

Further, when the display resolution is XGA (1024×768), the data transfer rate is 4.8 Gbps (14.5 Gbps in the color sequential method). In order to transfer the data with a 64-bit bus width, the transfer clock is 75.4 MHz (226.2 MHz in the color sequential method).

Figure 6:
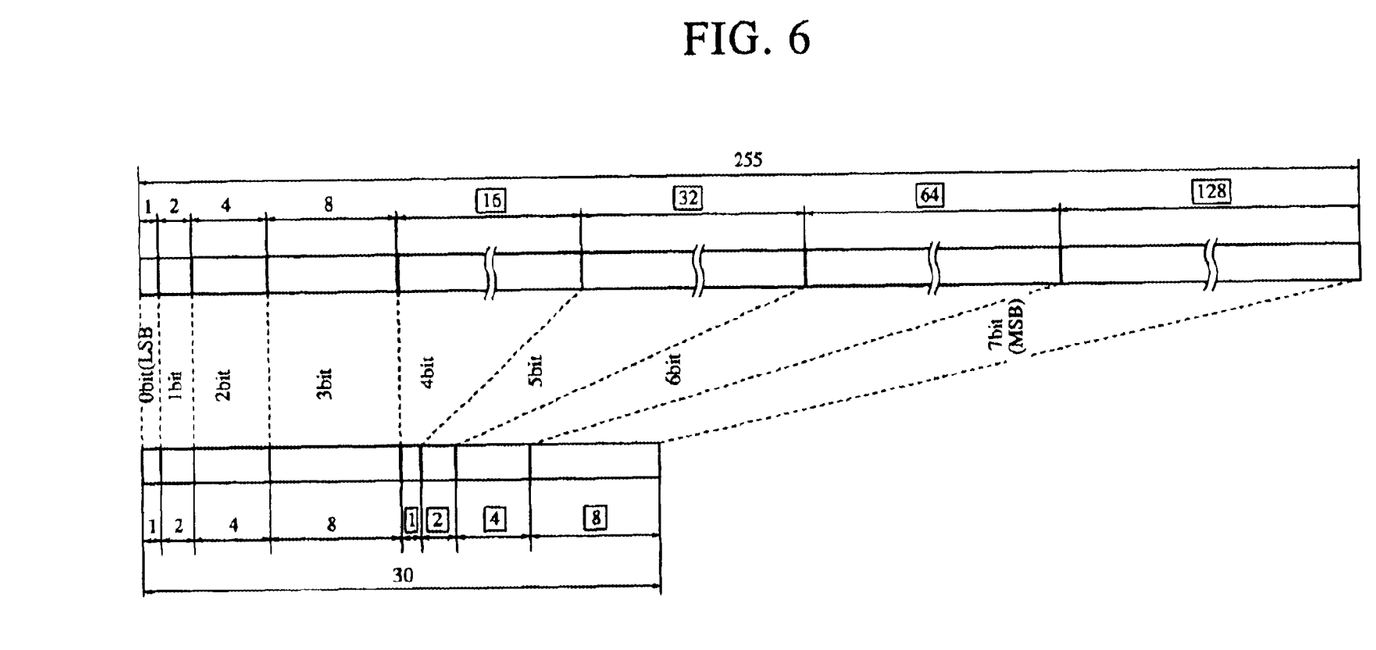
FIG. 6 illustrates another driving method of the second embodiment of the present invention.

FIG. 6 shows another driving method in the second embodiment. Herein, the amount of light reflection in the third driving state is set to be 1/16 of that in the first driving state. In this case, if the zeroth bit (LSB) to the third bit are driven in the third driving state and the fourth bit to the seventh bit (MSB) are driven in the first driving state, the total number of the time slots needed for 8-bit gradation display is 30, which is 1/8.5 of the case of binary control.

In this case, the time allotted to the unit time slot is 553 μs if one frame period is 16.6 msec (184 μs in the color sequential method).

Further, when the display resolution is XGA (1024×768), the data transfer rate is 1.4 Gbps (4.3 Gbps in the color sequential method). In order to transfer the data with a 64-bit bus width, the transfer clock is 22.2 MHz (66.7 MHz in the color sequential method).

As described above, in the third driving state, it becomes possible to decrease the response speed needed for the display device, and to suppress the data transfer rate and transfer clock frequency.

(Third Embodiment)

Figure 7:
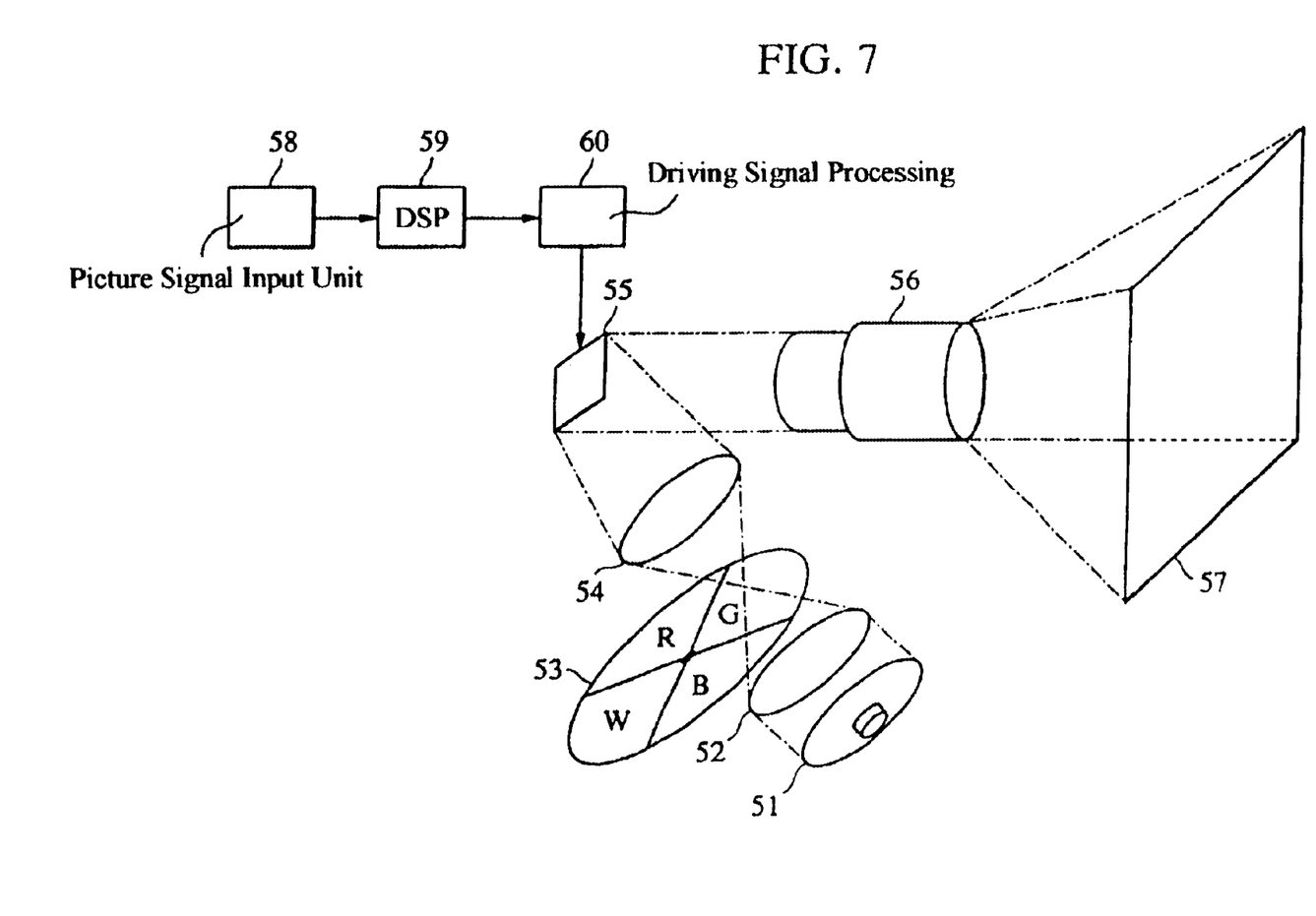
FIG. 7 is a block diagram of a projection display apparatus of a third embodiment of the present invention.

FIG. 7 shows a system block diagram of a projection display apparatus of a third embodiment of the present invention.

In FIG. 7, reference numeral 51 denotes a light source, reference numeral 52 denotes a first focusing lens, reference numeral 53 denotes a color wheel, reference numeral 54 denotes a second focusing lens, reference numeral 55 denotes a TMA chip, reference numeral 56 denotes a zoom lens, reference numeral 57 denotes a screen, reference numeral 58 denotes a picture signal input unit, reference numeral 59 denotes a digital signal processor (DSP), and reference numeral 60 denotes a driving signal processor.

Light emitted from the light source 51 is focused by the first focusing lens 52 and enters the color filter wheel 53. The color wheel 53 is rotated by a motor so that RGB and white light pass therethrough in order. The passed light is incident on the TMA chip 55 through the second focusing lens 54. A picture signal is input to the picture signal input unit 58. After various types of image processing in the DSP 59, the picture signal is input to the driving signal processor 60. In the driving signal processor 60, a driving signal of the TMA chip 55, which is described in the first or second embodiment, is generated. The TMA chip 55 controls the tilt angle of each pixel in accordance with an image driven by the driving signal processor 60, and reflects light emitted through the second focusing lens 54 in accordance with the image data. The reflected image is projected on the screen 57 through the zoom lens 56.

The driving signal processor 60 comprises circuits including the above-described PWM conversion circuit 2 and the D/A conversion circuit 6, and drives in a manner described in the first or second embodiment.

Accordingly, the projection display apparatus of the present invention reduces brightness nonuniformity in the display, which results from manufacturing variations of each display cell, which occurred in a conventional linear driving method. Conventional methods require a D/A converter having the number of bits corresponding to the number of display gradations. In contrast, the present invention requires a D/A converter having only the number of bits corresponding to the number of gradations represented by the subframe of the minimum period, hence, size of the circuit is reduced and low cost can be achieved.

Also, the response speed needed for the display device can be reduced, and the data transfer rate and transfer clock frequency can be suppressed.

Further, in the embodiments of the present invention, a reflective light modulation element is described, but a transmission light modulation element can be alternatively used.

According to the present invention, size of the circuit can be reduced. Also, the response speed of the display device can be reduced, and the data transfer rate and transfer clock frequency can be suppressed. More specifically, the display device according to the present invention includes a light modulator used as image forming means and a projection optical system for projecting and displaying an image, wherein gradation is represented by varying the ON-time in the temporal axis during one frame period of the light modulator, and the ON-time is used by at least three light components. The display device has a first display period in which a second reflection angle and a first reflection angle are mutually switched for displaying and a second display period in which the second reflection angle and the first reflection angle or a third reflection angle are mutually switched for displaying. With this arrangement, it becomes possible to reduce brightness nonuniformity in the display, which results from manufacturing variations of each display cell, which occurred in a conventional linear driving method. Conventional methods require a D/A converter having the number of bits corresponding to the number of display gradations. In contrast, the present invention requires a D/A converter having only the number of bits corresponding to the number of gradations represented by the subframe of the minimum period, and thus size of the circuit is reduced and low cost can be achieved.

By using the driving method of the second embodiment of the present invention, the response speed needed for the display device can be reduced, and the data transfer rate and transfer clock frequency can be suppressed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A projection display apparatus comprising:
   a light modulator used as image forming means; and
   a projection optical system for projecting and displaying an image,
   wherein gradation is represented by varying ON-time in the temporal axis during one frame period of said light modulator, and
   the ON-time is used by at least three light components,
   wherein said three light components comprises
      a first light component to make the light reflect or transmit maximally,
      a second light component to make the light reflect or transmit minimally, and
      a third light component to make the light reflect or transmit intermediately, and wherein
         said light modulator is a reflective device including a micromirror, and said gradation is performed by controlling said micromirror to at least three reflection angles including a first reflection angle in which the amount of light reflection to the projection optical system is the maximum; a second reflection angle in which the amount of light reflection to the projection optical system is the minimum; and a third reflection angle between the first reflection angle and the second reflection angle in which the amount is between the amount for the first reflection angle and the amount for the second reflection angle.

2. The projection display according to claim 1, wherein, in representing gradation by varying the ON-time in the temporal axis during one frame period, said light modulator has a first display period in which the second reflection angle and the first reflection angle are mutually switched for displaying, and a second display period in which the second reflection angle and the first reflection angle or the third reflection angle are mutually switched for displaying.

3. The projection display apparatus according to claim 2, wherein the second display period is the shortest period among a plurality of subframe periods in a time-division gradation representation of one frame period.

4. The projection display apparatus according to claim 1, wherein, in representing gradation by varying the ON-time in the temporal axis during one frame period, said light modulator has a first display period in which the second reflection angle and the first reflection angle are mutually switched for displaying, and a second display period in which the second reflection angle and the third reflection angle are mutually switched for displaying.

5. The projection display apparatus according to claim 4, wherein the first display period and the second display period are allotted so that the total number of time slots which constitute a plurality of subframes for performing gradation by time-dividing one frame period is minimized.

6. A method for driving a light modulator, comprising the steps of:
   dividing one frame period of the light modulator into subframe periods which have different periods corresponding to each bit;
   performing gradation display by at least ternary digits in the light modulator during the minimum subframe period;
   performing binary gradation display during subframe periods other than the minimum subframe period;
   performing a first driving state for displaying white, a second driving state for displaying black, and a third driving state for gradation display between the white display and the black display, and
   setting the amount of light reflection in the third driving state to be small by a predetermined proportion to the amount of light reflection in the first driving state, wherein
      the third driving state is performed during the minimum subframe period so that the ternary digits can be performed, and
      the first and second states are performed during subframe periods other than the minimum subframe period.

7. A method for driving a light modulator, comprising the steps of:
   performing a first driving state for displaying white, a second driving state for displaying black, and a third driving state for gradation display between the white display and the black display;
   setting the amount of light reflection in the third driving state to be small by a predetermined proportion to the amount of light reflection in the first driving state,
   dividing one frame period of the light modulator into subframe periods which have different periods corresponding to each bit;
   allotting any one of the first driving state and the third driving state to each of the subframe periods;
   defining a time slot corresponding to the minimum subframe period as a unit time slot; and
   reducing the predetermined proportion the number of time slots in the subframe periods to which the first driving state is allotted, so as to reduce the total number of time slots in the one frame period,
   thereby making a unit time slot period, which is the one frame period divided by the reduced total number of time slots, longer than a unit time slot period, which is the one frame period divided by the unreduced total number of time slots.

* * * * *

UNITED STATES PATENT AND TRADEMARK OFFICE
CERTIFICATE OF CORRECTION

PATENT NO. : 6,719,427 B2
DATED : April 13, 2004
INVENTOR(S) : Yukihiko Sakashita et al.

It is certified that error appears in the above-identified patent and that said Letters Patent is hereby corrected as shown below:

Title page,
Item [75], Inventors, "Akihiko Ouchi" should read -- Akihiro Ouchi --.

Signed and Sealed this

Third Day of May, 2005

JON W. DUDAS
*Director of the United States Patent and Trademark Office*